United States Patent [19]

Verrette et al.

[11] Patent Number: 5,480,078
[45] Date of Patent: Jan. 2, 1996

[54] GOLF BAG CART DETACHABLE ACCESSORY CARRIER

[75] Inventors: Steven M. Verrette; Christopher C. Bean, both of Los Alamitos, Calif.

[73] Assignee: C & S Industries, Los Alamitos, Calif.

[21] Appl. No.: 115,477

[22] Filed: Aug. 30, 1993

[51] Int. Cl.⁶ .................................. B62B 1/16; B60R 9/08
[52] U.S. Cl. ................ 224/274; 280/47.19; 280/DIG. 6; D34/15; 224/918; 224/919
[58] Field of Search ............................ 280/47.18, 47.19, 280/47.26, 47.28, 652, 769, DIG. 4, DIG. 5, DIG. 6, 47.33, 645, 646; 224/274, 279, 918, 919; 248/96; D34/15

[56] References Cited

U.S. PATENT DOCUMENTS

| | | | |
|---|---|---|---|
| 1,744,557 | 1/1930 | Kuntz | 248/96 |
| 2,570,504 | 10/1951 | Van House | 280/DIG. 6 X |
| 2,579,639 | 12/1951 | Adams | 280/47.19 X |
| 2,918,297 | 12/1959 | Peters | 28/47.26 X |
| 2,921,797 | 1/1960 | Berglund et al. | D34/15 X |
| 3,679,226 | 7/1972 | Bresser | 280/47.19 |
| 3,704,025 | 11/1972 | Cerveny et al. | 280/47.19 X |
| 4,082,209 | 4/1978 | Sanders | 224/919 X |
| 4,550,930 | 11/1985 | Proffit | 280/DIG. 6 X |
| 4,864,334 | 9/1989 | Ellis | 280/47.26 X |
| 5,193,842 | 3/1993 | Fontenot | 280/DIG. 6 X |
| 5,244,114 | 9/1993 | Traegde | 224/274 X |

FOREIGN PATENT DOCUMENTS 3938106  5/1991  Germany .................. 280/DIG. 5

Primary Examiner—Brian L. Johnson
Attorney, Agent, or Firm—Hawes & Fischer

[57] ABSTRACT

A golf bag and accessory carrier encompasses both an apparatus and method which serves the utility of a golfer both in carrying his golf bag, carrying his accessories, providing a water resistant carrying compartment, a basket type storage area, a self righting liquid refreshment carrier and a golf ball holder. These structures are enabled while still fully enabling a folding function, to enable the golf bag cart to be conveniently carried and stowed in the trunk or back seat of a car. The golf bag cart and accessory carrier provides a carriage and utility area wider than the golf bag being carried, both for stability and enhanced convenience.

2 Claims, 4 Drawing Sheets

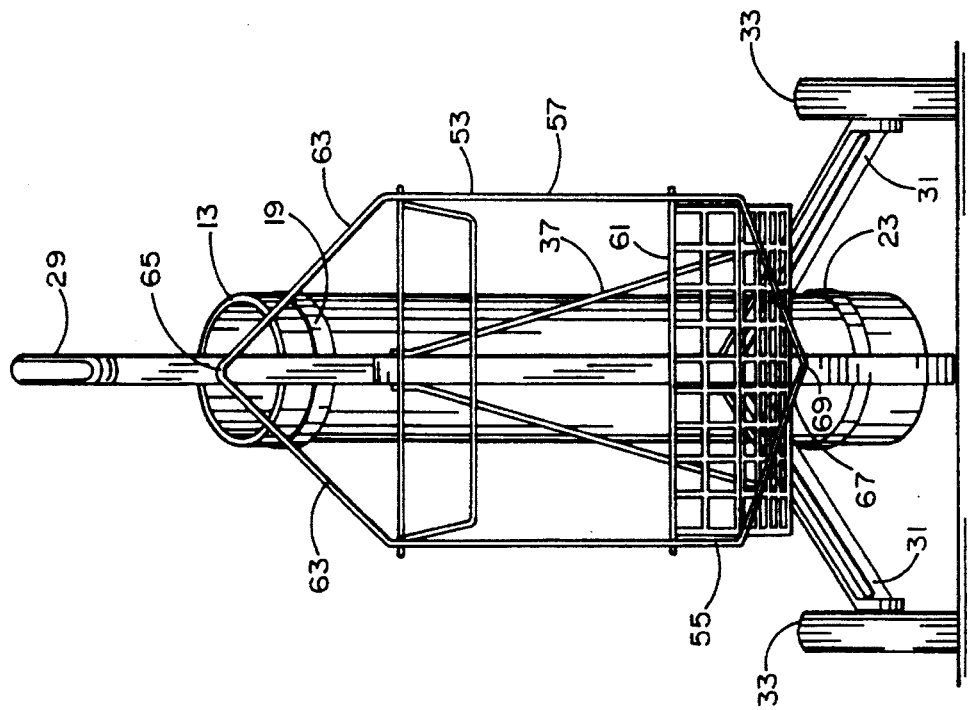
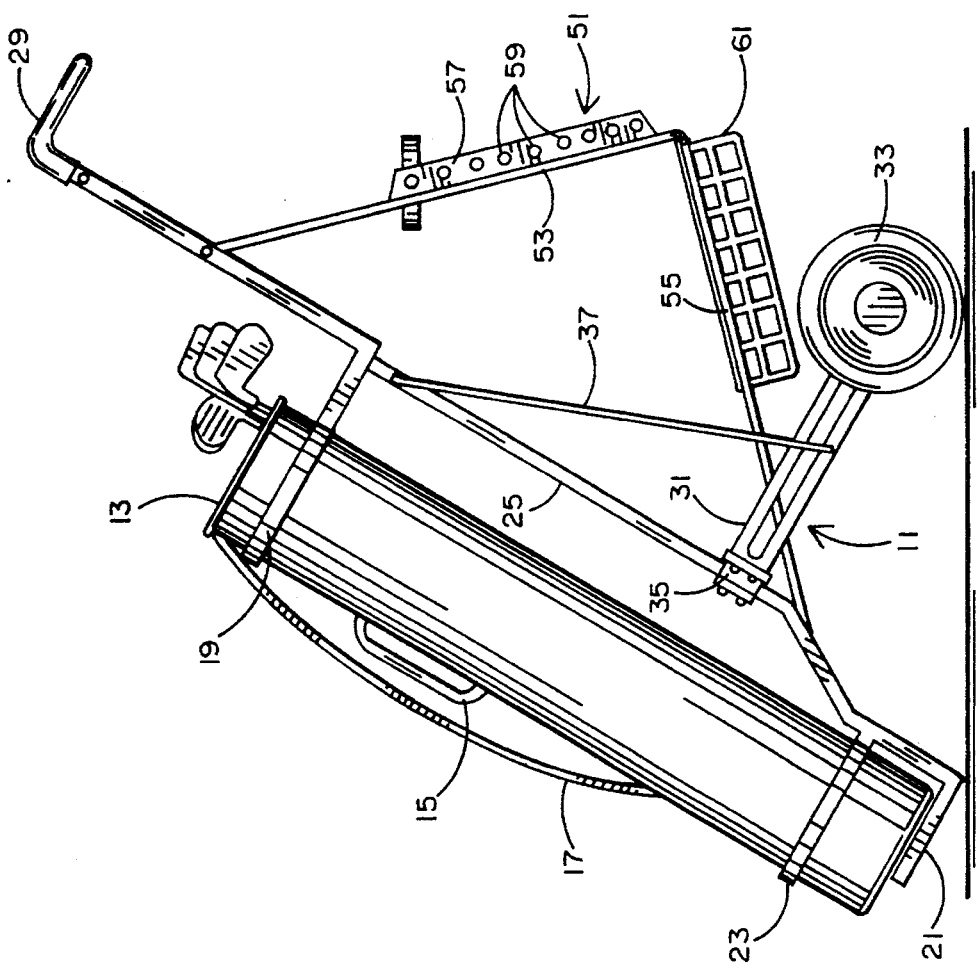

GOLF BAG CART DETACHABLE ACCESSORY CARRIER

FIELD OF THE INVENTION

The present invention relates to the field of golf implements and accessories. More specifically, the present invention relates to a golf bag folding carrier and attachable accessory carrier which is particularly designed to provide wide utility to the golfer and enhance the enjoyment and convenience of the game.

BACKGROUND OF THE INVENTION

Between the extremes of carrying one's golf bag and utilizing a golf cart to carry a bag is the use of a rolling bag carrier. Several such brands and styles of golf bag cart are known and widely used on golf courses. Many have folding frames and several differing structures to engage the golf bag. Some rolling carriers support the golf bag at its bottom end with a single rod, and secure the golf bag at its top end with a strap extending about the top of the bag.

Another disadvantage of currently available golf bag carts is their lack of utility surfaces. Most utility items used in combination with a golf bag and golf bag cart are required to be hung or attached to the bag. Typically golf bag carts are foldably collapsible; an aspect which severely limits the other structures which can be employed to serve the convenience of the golfer. In addition, such foldable collapsibility is brought about through a variety of mechanisms.

In some bag carriers, the wheels fold downwardly and together, while in others the wheels fold upwardly. A variety of mechanism cause problems in that structures are not readily attachable to all golf bag carts since the points of attachment may impede the folding action. Since the objective of most golf bag carts is their minimum size when folded, and their ability to be folded while still attached to the golf bag, the ability to include a utility carrier is severely curtailed.

The permanent addition of utility structures to currently available folding designs would consequently destroy or effectively limit the folding action, and the marketability of the golf bag cart, since they are initially selected based upon light weight and small size when folded.

In other cases, golfers are known to carry liquid refreshments in the form of cups and cans while opened. In some instances, such cups and cans are simply shoved into zippered pouches on the golf bag being supported by the golf carrier. Not only can such practice ruin the golf bag or at the least cause it to need frequent washing, but the angle of tilt of the beverage is dictated by the angle of tilt of the golf bag cart. The tilt of the golf bag cart may depend upon the height of the golfer and other terrain over which the golf bag is being carried.

Further, structures should be available to protect and keep dry items which would otherwise become wet in the event of a sudden rainstorm. In various locations, most notably Florida, rainstorms can form, occur without advance notice. In effect, the golf carrier which is best serves the golfer in the widest variety of conditions.

further, several golf ball carriers are currently in use which singly or serially support and enable the selection of golf balls. For example, some golf ball dispenser tubes are available which hand from the bag. Only the ball at the bottom of the tube is available for being dispensed unless the golfer chooses to dump the balls out and re-assemble them into the tube. Carrying the balls in a pouch requires digging about for them for "hand samples" of a subset of the balls in the pouch, and which subset may or may not contain the ball desired by the golfer.

Further, golfers are in differing ring stages of ownership with respect to accessories. A utility carrier which requires all functions to be carried simultaneously may not fit with a particular golfer's needs since he may already have favorite tools, holders, carriers, etc for his particular purposes. The presence of superfluous structures on a utility carrier may cause a golfer to forego badly needed utility storage space in order to refrain from having unused structures, or in the alternative to refrain from ceasing to use his favorite golf accessory holder, such as a pocket tee holder, for example.

What is therefore needed is a utility carrier for a golf bag cart which is detachable, and therefore still enables the golf bag cart to fold to its minimum size. By enabling the folding of the golf bag cart to its minimum size, the dominant utility of small size is maintained. Detachability and re-attachability should be through a structure which is so universal that all types of golf bag carts may be utilized in conjunction with the utility carrier. This detachability should be utilizable with a structure which still contains structure which will enable the comforts of the golfer to be served. Structures should include carry spaces for garments, tees, and liquid refreshments.

What is further needed is a utility carrier for a golf bag cart which may be customizable to suit a particular golfer's needs.

SUMMARY OF THE INVENTION

The golf bag and accessory carrier of the present invention encompasses both an apparatus and method which serves the utility of a golfer both in carrying his golf bag, carrying his accessories, providing a water resistant carrying compartment, a basket type storage area, a self righting liquid refreshment carrier and a golf ball holder. These structures are enabled while still fully enabling a folding function, to enable the golf bag cart of the present invention to be conveniently carried and stowed in the trunk or back seat of a car. The golf bag cart of the present invention provides a carriage and utility area wider than the golf bag being carried, both for stability and enhanced convenience.

BRIEF DESCRIPTION OF THE DRAWINGS

FIG. 1 is a side view of the utility carrier of the present invention illustrated with a typical golf bag cart in the deployed position and with a supported golf bag;

FIG. 2 is a rear view of the utility carrier as was shown in FIG. 1;

DETAILED DESCRIPTION OF THE PREFERRED EMBODIMENT

Figure 3:
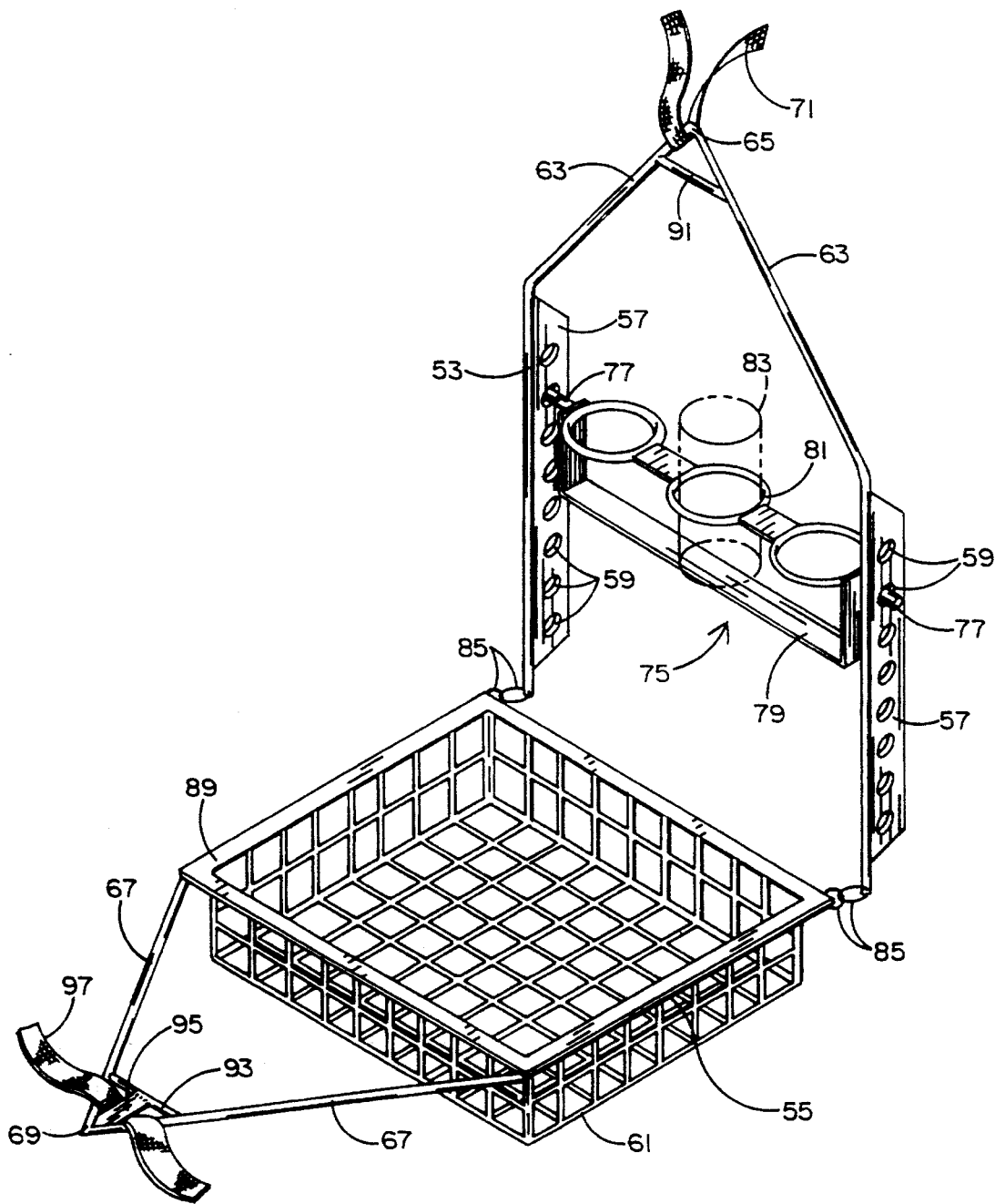
FIG. 3 is a perspective view of the utility carrier which was shown attached to a golf bag cart in FIGS. 1 and 2.

The description and operation of the invention will be best described with reference to FIG. 1. FIG. 1 shows a wheeled golf bag cart 11 supporting a golf bag 13. Golf bag 13 may typically have a handle 15 or a strap 17. The golf bag cart 11 is equipped with a strap 19 for engaging the golf bag 13 at its upper end. At the lower end of the golf bag 13 is a lip 21 and possibly a lower strap or ring 23 for securing the golf bag 13 at its bottom end. It is understood that the structures 19 and 23 may be either rings or straps, or other structures designed to keep the golf bag 13 on the golf bag cart 11.

The golf bag cart 11 has several familiar structures including a rear support 25 from which the strap 19 and ring 23 depend, an upper handle 29 which is grasped by the golfer to move the golf bag cart 11, typically by pulling. A wheel support structure 31 is illustrated which not only engages the wheels 33, but has a fitting 35 for slidable engagement with a portion of the length of the rear support. A strut 37 engages both the rear support 25 and the strut 37 to form a stable triangular configuration while the golf bag cart 11 is deployed.

In the configuration shown, movement of the fitting 35 upwardly with respect to the rear support 25 will cause the wheel support structure 31 to pivot with respect to the end of the strut 37 and cause the wheels to be folded downwardly and toward the rear support 25.

To the rear and angled with respect to the golf bag cart 11 hangs the utility carrier 51 of the present invention. Utility carrier 51 has a nearly vertical portion 53 and a nearly horizontal portion 55. The nearly vertical portion 53 forms a pair of structures and may be of a bar type construction and each nearly vertical portion 53 has a rearwardly projecting elongate flange 57 having a series of holes 59. The nearly horizontal portion 55 contains a suspended basket 61 which is shown tilted at the same angle of the nearly horizontal portion 55.

The details of attachment of the utility carrier 51 to the golf bag cart 11 will be further shown in subsequent Figures. Referring to FIG. 2, a rear view of the golf bag cart 11 illustrates the evenness with which the utility carrier balances with respect to the golf bag cart 11. The nearly vertical portion 53 extends to an angled portion 63 which joins at an apex 65. Apex 65 may be attached to the utility carrier 51 via a number of structures.

However, one structure which is suitable is a VELCRO fastener strap, which will be shown. Since apex 65 forms a shallow angle, any structure can be utilized for upper support, including hooks, ties, attachment plates, and the like. As is also shown, the nearly horizontal portion 55 extends to an angled portion 67 which joins at an apex 69 and can also be utilized for lower support with attachment structures, including hooks, ties, attachment plates, and the like.

Referring to FIG. 3, an enlarged perspective view of the utility carrier 51 illustrates additional features not seen with regard to FIGS. 1 and 2. Beginning at the top of FIG. 3, a short length of strapping 71 is shown which may be utilized to secure the utility carrier 51 to the golf bag cart 11. This strapping may have hook-like members which are engageable with felt-like members, and which is popularly and generically known as VELCRO.

Suspended between the flanges 57 from a pair of their holes 59 is a self-righting multiple beverage container support 75. The support 75 has a pair of rods 77, one extending from each side end of the support 75. The end of each rod 77 extends through holes 59 which have the same vertical height in order to balance the support 75. With this configuration, it can be seen that a tilting of the cart 11 will allow the support 75 to pivot with gravity to insure that any beverage containers supported by the support 75 is kept in the upright position.

The ends of the rods 77 may have a raised land to insure that the rods 77 will not fall away from the holes 59 without being lifted. Alternatively, the rods 77 may be long enough that the nearly vertical portions 53 may be forced apart in order to enable the support 75 to be mounted.

Support 75 has a band 79 which forms side and bottom retaining structures, as well as sufficient depth to ensure that any beverages placed in the support 75 will have a center of gravity lower than the level of the rods 77 to insure that a weighted type balance will be maintained. The band 79 is attached to a multiple, in this case triple, ring structure 81 which extends between the rods 77. It is understood that a support 75 can be made which will support more or less than the three units shown for the support currently shown in FIG. 3. A glass beverage container 83 is shown to illustrate the position in which support 75 accommodates such a container 83.

Note the junction between the nearly horizontal portions 55 and the nearly vertical portions 53. These portions are joined using a pair of connector rings 85. Each connector ring 85 is joined through an aperture of one of the nearly horizontal portions 55 and the nearly vertical portions 53, and another connector ring 85. A single connector ring 85 could be used to join the nearly horizontal portions 55 to the nearly vertical portions 53, but there would be less freedom of movement between the two.

Suspended basket 61 is suspended between the nearly horizontal portions 55 by a lip 89 which extends from the upper rim portion of the suspended basket 61. The angled portion 63 has a cross member 91 near the apex 65. Similarly, the angled portion 67 has a cross member 93 near the apex 69. However, there is a connecting member 95 between the apex 69 and cross member 93. Such a connecting member 95 permits the use of a strap from an axis other than that available at apex 69. Such a connecting member 95 can be made available between apex 65 and cross member 91, if necessary. Connecting member 95 is illustrated to show the possibility to re-orient the axis from which straps, such as the length of strapping 71, or a length of strapping 97 shown adjacent apex 69, may be used.

Figure 4:
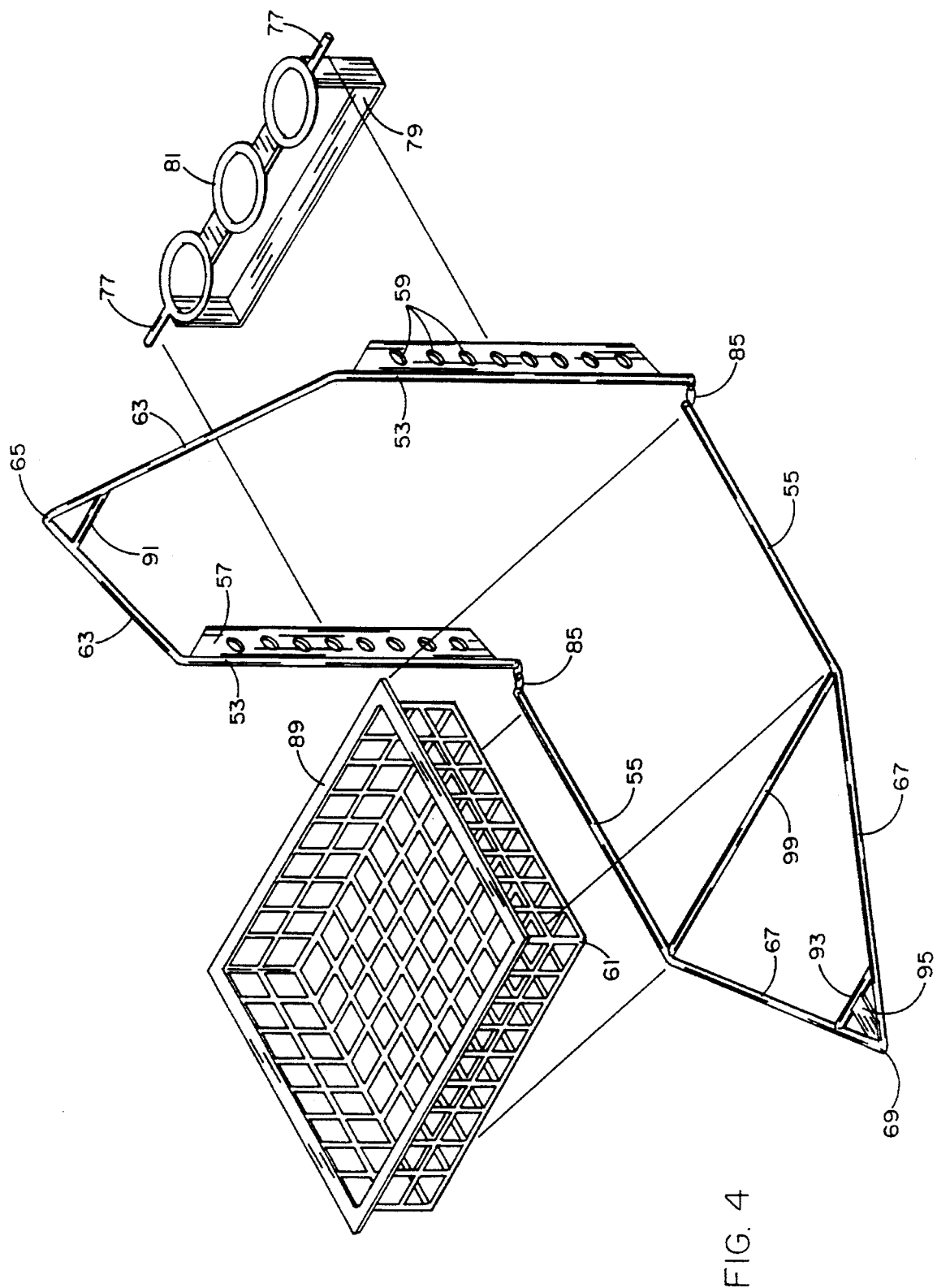
FIG. 4 is an exploded view of the utility carrier shown in FIG. 3.

Referring to FIG. 4, an exploded view illustrates the presence of a forward basket support 99 which was not previously seen. Note also that in FIG. 4, only a single connector ring 85 is utilized to connect each of the nearly horizontal portions 55 to the nearly vertical portions 53. The forward basket support 99 provides the stability for the suspended basket 61 to compensate for the looseness of the connection through the connector rings 85.

Figure 5:
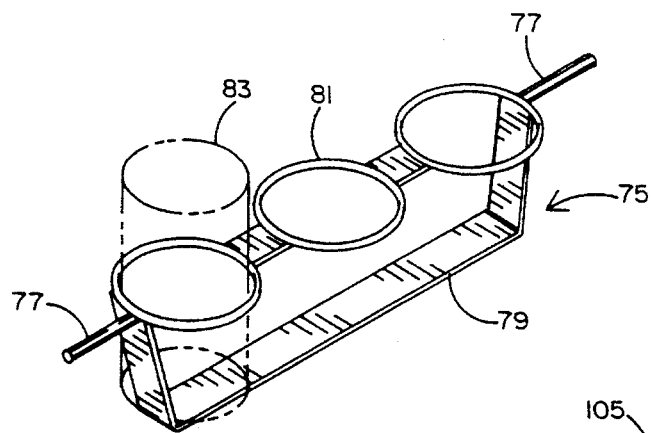
FIG. 5 is a perspective view of a self-righting multi-cup beverage holder utilizable with the utility carrier of FIGS. 1–4.

Referring to FIG. 5, a slightly differing version of the support 75 is shown having increased diameter ring structure 81 to accommodate different sized containers, such as, for example, twelve ounce beverage cans. Again, many different configurations of support 75 may be had.

Figure 6:
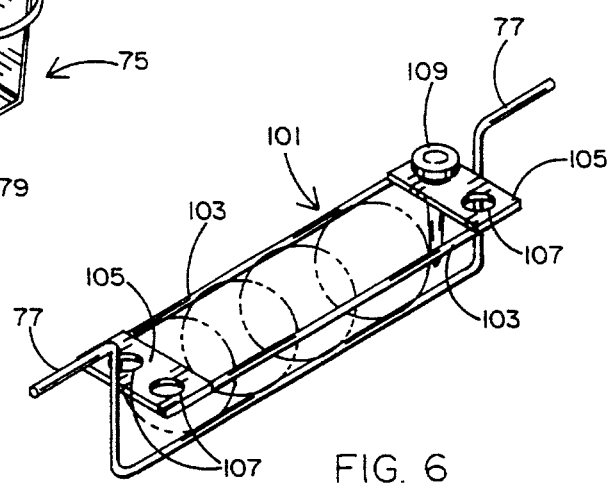
FIG. 6 is a perspective view of a horizontal golf ball holder utilizable with the utility carrier of FIGS. 1–5.

Referring to FIG. 6, a golf ball holder 101 includes a continuous length between the rods 77 which previously formed the ends of the support 75. An upper structure having a pair of side arms 103 extend between vertical extensions of the rods 77. A pair of plates 105 located adjacent the vertical extensions of the rods 77 carry round apertures 107 for supporting golf tees 109, one of which is shown. Golf ball holder 101 is configured to hold about six golf balls, and the apertures 107 shown number four for holding four tees 109.

Figure 7:
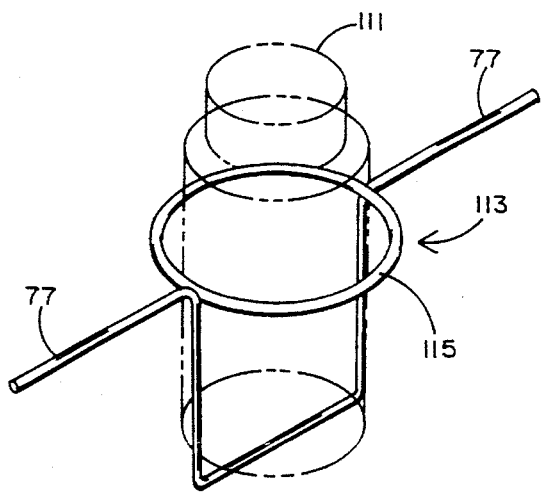
FIG. 7 is a perspective view of a self-righting, larger sized beverage holder utilizable with the utility carrier of FIGS. 1–6.

Referring to FIG. 7, a single container 111 is shown supported by a single container support 113. Here, a pair of rods 77 engage a single ring 115. The pair of rods 77 are continuous and dip below the plane of the single ring 115 to support the single container 111 at its bottom. Its function is similar to the supports 75 shown earlier.

Figure 8:
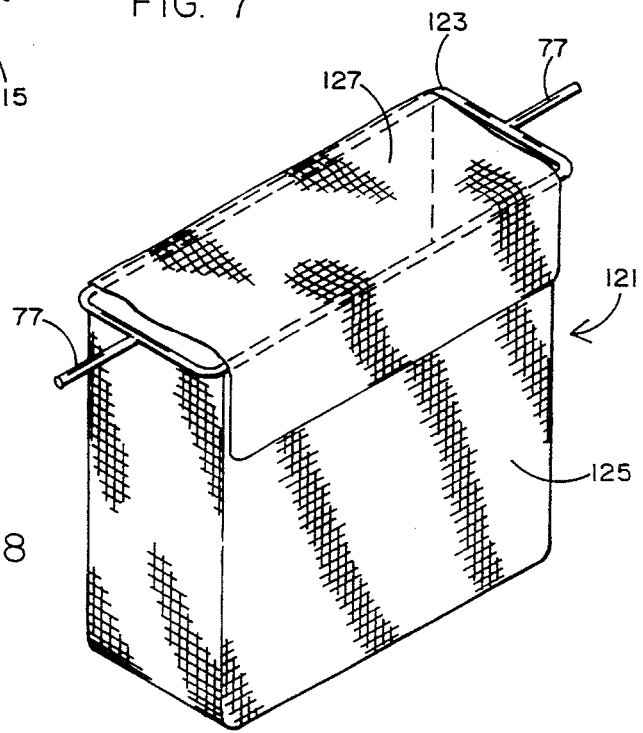
FIG. 8 is a perspective view of a water resistant pouch utilizable with the utility carrier of FIGS. 1–7.

Referring to FIG. 8, a storage bag assembly 121 is shown suspended from a rectangular loop 123. The rectangular loop 123 has the rods 77 extending from the shorter dimension of the ends. The storage bag assembly 121 has a bag 125 portion and a flap 127 portion covering the rectangular loop 123 and bag 125. The flap 127 may be weighted to insure that it does not inadvertently flip open during times when the golf bag cart 11 is in motion. Bag 125 and its flap 127 may be made of water resistant material to protect the items within.

The accessories shown in FIGS. 3–8 may be employed with respect to the golf bag cart 11 singly or multiply. The utility carrier 51 can carry any combination of the accessories shown in FIGS. 3–8, and such selective carriage facilitates the marketing of the accessories separately. In this manner there will be no waste, since there will be no accessory to lie unused.

While the present invention has been described in terms of a detachable accessory carrier, one skilled in the art will realize that the structure and techniques of the present invention can be applied to many types of accessory carriage appliances. The present invention may be applied in any situation where a structure needs support and especially where the support from which it depends may be tilted about one axis.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A utility carrier for a golf bag cart comprising:

a generally vertical portion having an upper end and a lower end;

a generally horizontal portion having a first end connected to said lower end of said generally vertical portion and a second end;

attachment means for suspendably attaching said upper end of said generally vertical portion and said second end of said generally horizontal portion to a golf bag cart;

article support means, supported by said generally horizontal portion, for supporting articles to be carried;

suspension means supported by said generally vertical portion for carrying accessories and wherein said suspension means further comprises a pair of spaced apart flanges each having a plurality of apertures, the apertures on one of said pair of flanges equal in height to the apertures on the other of said pair of flanges;

at least one accessory to be supported by a pair of equal height apertures of said spaced apart flanges, said accessory further comprising:

a support structure further comprising:

a pair of rods horizontally extending from said support structure and having ends engageable with said pair of equal height apertures of said flanges;

a pair of spaced apart side arms having ends extending between positions adjacent said ends of said rods;

a pair of plates, connecting the ends of said pair of side arms, each said plate spanning the space between said apart side arms adjacent the ends of said side arms, said rods being continuous with respect to each other and extending below the ends of said side arms; and wherein said pair of spaced apart side arms are spaced apart sufficiently from each other and from said continuous extent of said rods to support a plurality of golf balls.

2. The utility carrier system of claim 1 wherein at least one of said pair of plates has at least one aperture having a size smaller than the largest diameter of a standard sized golf tee, for supporting a golf tee.

\* \* \* \* \*